US009858423B2

(12) United States Patent
Hay et al.

(10) Patent No.: US 9,858,423 B2
(45) Date of Patent: Jan. 2, 2018

(54) APPLICATION MODIFICATION BASED ON A SECURITY VULNERABILITY

(71) Applicant: International Business Machines Corporation, Armonk, NY (US)

(72) Inventors: Roee Hay, Haifa (IL); Omer Tripp, Bronx, NY (US)

(73) Assignee: International Business Machines Corporation, Armonk, NY (US)

( * ) Notice: Subject to any disclaimer, the term of this patent is extended or adjusted under 35 U.S.C. 154(b) by 160 days.

(21) Appl. No.: 14/992,245

(22) Filed: Jan. 11, 2016

(65) Prior Publication Data

US 2017/0200012 A1    Jul. 13, 2017

(51) Int. Cl.
  *G06F 21/57*    (2013.01)
  *G06F 21/31*    (2013.01)
(52) U.S. Cl.
  CPC ............ *G06F 21/577* (2013.01); *G06F 21/31* (2013.01); *G06F 2221/033* (2013.01)
(58) Field of Classification Search
  CPC ... G06F 21/31; G06F 21/577; G06F 2221/033
  See application file for complete search history.

(56) References Cited

U.S. PATENT DOCUMENTS

| | | | | |
|---|---|---|---|---|
| 7,636,856 | B2* | 12/2009 | Gheorghescu | G06F 21/566 713/187 |
| 9,372,785 | B2* | 6/2016 | Wang | G06F 11/3684 |
| 2002/0166016 | A1* | 11/2002 | Stoodley | G06F 9/44521 710/200 |
| 2010/0293407 | A1* | 11/2010 | Locasto | G06F 11/3672 714/2 |
| 2011/0055813 | A1* | 3/2011 | Calendino | G06F 11/3672 717/124 |
| 2012/0131668 | A1* | 5/2012 | Berg | G06F 21/577 726/22 |
| 2012/0266247 | A1* | 10/2012 | Guy | G06F 21/577 726/25 |

(Continued)

OTHER PUBLICATIONS

Perdisci et al., "Classification of Packed Executables for Accurate Computer Virus Detection", Retrieved From https://pdfs.semanticscholar.org/84f7/c1f8856bedf8d3e442b33ff5a28e616abd44.pdf, Published Jun. 16, 2008.*

(Continued)

*Primary Examiner* — Chau Le
(74) *Attorney, Agent, or Firm* — Terrile, Cannatti, Chambers & Holland, LLP; Stephen A. Terrile (57) ABSTRACT

In some examples, a method includes inserting monitoring instructions to be executed with a set of conditional operations and data type operations in an application and executing the application with a benign value. The method can also include storing at least one of result values and path constraints from the monitoring instructions, the result values comprising values generated by each conditional operation and each data type operation executed with the benign value. Furthermore, the method can include generating a prohibited value corresponding to a security vulnerability that satisfies the set of conditional operations and data type operations in the application based on the result values and the path constraints and modifying the application to prevent execution of the prohibited value.

20 Claims, 5 Drawing Sheets

(56) References Cited

U.S. PATENT DOCUMENTS

| | | | | |
|---|---|---|---|---|
| 2012/0311713 | A1* | 12/2012 | Amit | G06F 21/563 |
| | | | | 726/25 |
| 2014/0173571 | A1* | 6/2014 | Gluck | G06F 11/3636 |
| | | | | 717/130 |
| 2014/0317745 | A1* | 10/2014 | Kolbitsch | H04L 63/1416 |
| | | | | 726/24 |

OTHER PUBLICATIONS

Song et al., "BitBlaze: A New Approach to Computer Security via Binary Analysis", Retrieved From https://people.eecs.berkeley.edu/~dawnsong/papers/2008%20bitblaze%20a%20new%20approach.pdf, Published 2008.*

* cited by examiner

APPLICATION MODIFICATION BASED ON A SECURITY VULNERABILITY

BACKGROUND

The present disclosure relates to modifying applications, and more specifically, but not exclusively, to modifying an application based on identified security vulnerabilities in the application.

SUMMARY

According to an embodiment described herein, a system for modifying an application can include a processor to insert monitoring instructions to be executed with a set of conditional operations and data type operations in an application and execute the application with a benign value. The processor can also store at least one of result values and path constraints from the monitoring instructions, the result values comprising values generated by the set of conditional operations and data type operations executed with the benign value. The processor can also generate a prohibited value corresponding to a security vulnerability that satisfies the set of conditional operations and data type operations in the application based on the result values and the path constraints and modify the application to prevent execution of the prohibited value.

According to another embodiment, a method for modifying an application can include inserting, via a processor, monitoring instructions to be executed with a set of conditional operations and data type operations in an application. The method can also include executing, via the processor, the application with a benign value and storing at least one of result values and path constraints from the monitoring instructions, the result values comprising values generated by the set of conditional operations and data type operations executed with the benign value. Furthermore, the method can include generating, via the processor, a prohibited value corresponding to a security vulnerability that satisfies the set of conditional operations and data type operations in the application based on the result values and the path constraints, and modifying the application to prevent execution of the prohibited value.

According to another embodiment, a computer program product for modifying an application can include a computer readable storage medium having program instructions embodied therewith, wherein the computer readable storage medium is not a transitory signal per se. The program instructions can be executable by a processor to cause the processor to insert monitoring instructions to be executed with a set of conditional operations and data type operations in an application and execute the application with a benign value. Additionally, the program instructions can be executable by a processor to cause the processor to store at least one of result values and path constraints from the monitoring instructions, the result values comprising values generated by the set of conditional operations and data type operations executed with the benign value. Furthermore, the program instructions can cause the processor to generate a prohibited value corresponding to a security vulnerability that satisfies the set of conditional operations and data type operations in the application based on the result values and the path constraints, and modify the application to prevent execution of the prohibited value.

DETAILED DESCRIPTION

Software applications continue to grow in complexity, which results in applications with additional functions and function calls. Accordingly, verifying that an application exhibits a certain predetermined behavior can be increasingly time consuming. In some examples, applications can be executed with a large number of input values and the applications can be dynamically verified based on the results of the execution of the application for each value. For example, each execution of an application with a value can indicate if a predetermined condition or behavior is violated. However, this approach can be impractical if there are too many paths for data to flow in an application.

The embodiments described herein include techniques for modifying an application in response to detecting a security vulnerability. In some embodiments, a security vulnerability can include any aspect of an application that enables an unauthorized user to access data such as sensitive or confidential information. In some examples, the sensitive or confidential information can require user authorization in order to view or retrieve the sensitive or confidential information. In some embodiments, techniques for detecting a security vulnerability include inserting monitoring instructions into an application so that the monitoring instructions are executed with each conditional operation and data type operation. The monitoring instructions can enable a determination of path constraints associated with the execution of a benign value by an application. A benign value, as referred to herein, can include any suitable value that does not allow an unauthorized user to access confidential information. A path constrain, as referred to herein, includes any executed portion of a conditional statement. For example, a path constraint can include an executed branch of a for statement, a while statement, and the like.

In some embodiments, the path constraints associated with the execution of a benign value can be determined between a source point and a sink point in an application. The source point, as referred to herein, can include any suitable instruction in an application at which point monitoring of the execution of the application is to begin. In some examples, the source point can include an instruction to receive user input, and the like. The sink point, as referred to herein, can include any suitable instruction in an application that enables viewing or retrieving confidential information. For example, a sink point can include an instruction accessing a database, or any other storage device.

In some embodiments, techniques described herein enable the generation of a prohibited value. For example, the path constraints associated with the execution of a benign value can be analyzed to enable generation of a prohibited value that satisfies the path constraints. A prohibited value, as referred to herein, can include any value that enables an unauthorized user to access confidential information. For example, a prohibited value can include scripting characters that result in a sink point returning confidential information to an unauthorized user. In some embodiments, an application can be modified so that the generated prohibited value cannot be executed.

Figure 1:
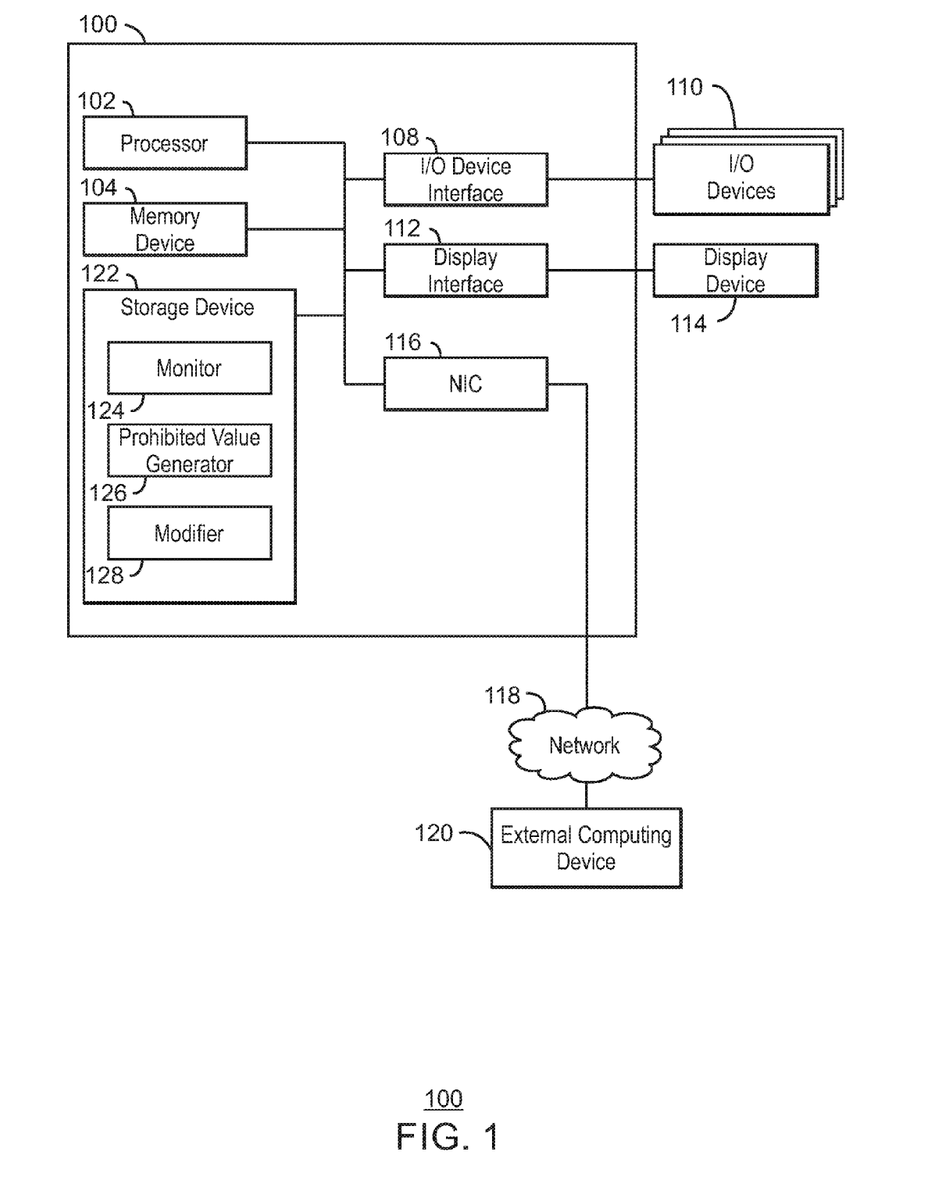
FIG. 1 depicts a block diagram of an example computing system that can modify an application according to an embodiment described herein.

With reference now to FIG. 1, an example computing device is depicted that can modify an application. The computing device 100 may be for example, a server, desktop computer, laptop computer, tablet computer, or smartphone. In some examples, computing device 100 may be a cloud computing node. Computing device 100 may be described in the general context of computer system executable instructions, such as program modules, being executed by a computer system. Generally, program modules may include routines, programs, objects, components, logic, data structures, and so on that perform particular tasks or implement particular abstract data types. Computing device 100 may be practiced in distributed cloud computing environments where tasks are performed by remote processing devices that are linked through a communications network. In a distributed cloud computing environment, program modules may be located in both local and remote computer system storage media including memory storage devices.

The computing device 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the computing device 100 to one or more I/O devices 110. The I/O devices 110 may include, for example, a keyboard and a pointing device, wherein the pointing device may include a touchpad or a touchscreen, among others. The I/O devices 110 may be built-in components of the computing device 100, or may be devices that are externally connected to the computing device 100.

The processor 102 may also be linked through the system interconnect 106 to a display interface 112 adapted to connect the computing device 100 to a display device 114. The display device 114 may include a display screen that is a built-in component of the computing device 100. The display device 114 may also include a computer monitor, television, or projector, among others, that is externally connected to the computing device 100. In addition, a network interface controller (NIC) 116 may be adapted to connect the computing device 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. An external computing device 120 may connect to the computing device 100 through the network 118. In some examples, external computing device 120 may be an external web-server 120. In some examples, external computing device 120 may be a cloud computing node.

The processor 102 may also be linked through the system interconnect 106 to a storage device 122 that can include a hard drive, an optical drive, a USB flash drive, an array of drives, or any combinations thereof. In some examples, the storage device may include a monitor 124, a prohibited value generator 126, and a modifier 128. The modifier 124 can insert monitoring instructions into any suitable application and execute the application with a benign value. The application can include a mobile application, an enterprise application, or any other suitable computer program. The monitoring instructions can enable the monitor 124 to store path constraints and result values associated with conditional operations and data type operations in the application. A conditional operation, as referred to herein, can include any for loop, while loop, if statement, or any other conditional statement. In some examples, the conditional operation can also include logical statements such as "and" statements and "or" statements, among others. A data type operation, as referred to herein, can include any instruction related to modifying a data type of a value, and initiating a data type of a value, among others. The result values, as referred to herein, can indicate how a conditional operation or data type operation was evaluated during execution of an application. For example, the result values can indicate a conditional branch of a conditional operation that was executed.

In some embodiments, the monitor 124 identifies and stores path constraints and result values in an application between a source point and a sink point in the application. The source point can correspond to a beginning point in a program to be verified and the sink point can correspond to an end point in a program to be verified.

The prohibited value generator 126 can generate a prohibited value corresponding to a security vulnerability that satisfies the conditional operations and the data type operations in the application based on the result values and the path constraints. The security vulnerability can include SQL injection, cross-site scripting, and cross-site request forgery, among others. In some examples, the prohibited value generator 126 can enable an unauthorized user to access confidential information. The prohibited value generator 126 can generate the prohibited value with a single execution of an application with a benign value. Therefore, the techniques described herein can reduce an amount of time to detect security vulnerabilities in an application and reduce an amount of processor execution time for testing an application.

In some embodiments, the modifier 128 can detect a set of changes to the application that prevents the security vulnerability and modify the application based on the set of changes. For example, the modifier 128 can modify conditional operations and data type operations to prevent a flow of data between a source point and a sink point that enables a security vulnerability.

It is to be understood that the block diagram of FIG. 1 is not intended to indicate that the computing device 100 is to include all of the components shown in FIG. 1. Rather, the computing device 100 can include fewer or additional components not illustrated in FIG. 1 (e.g., additional memory components, embedded controllers, modules, additional network interfaces, etc.). Furthermore, any of the functionalities of the monitor 124, prohibited value generator 126, and modifier 128 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the monitor 124, prohibited value generator 126, and modifier 128, can be implemented with logic, wherein the logic, as referred to herein, can include any suitable hardware (e.g., a processor, among others), software (e.g., an application, among others), firmware, or any suitable combination of hardware, software, and firmware.

Figure 2:
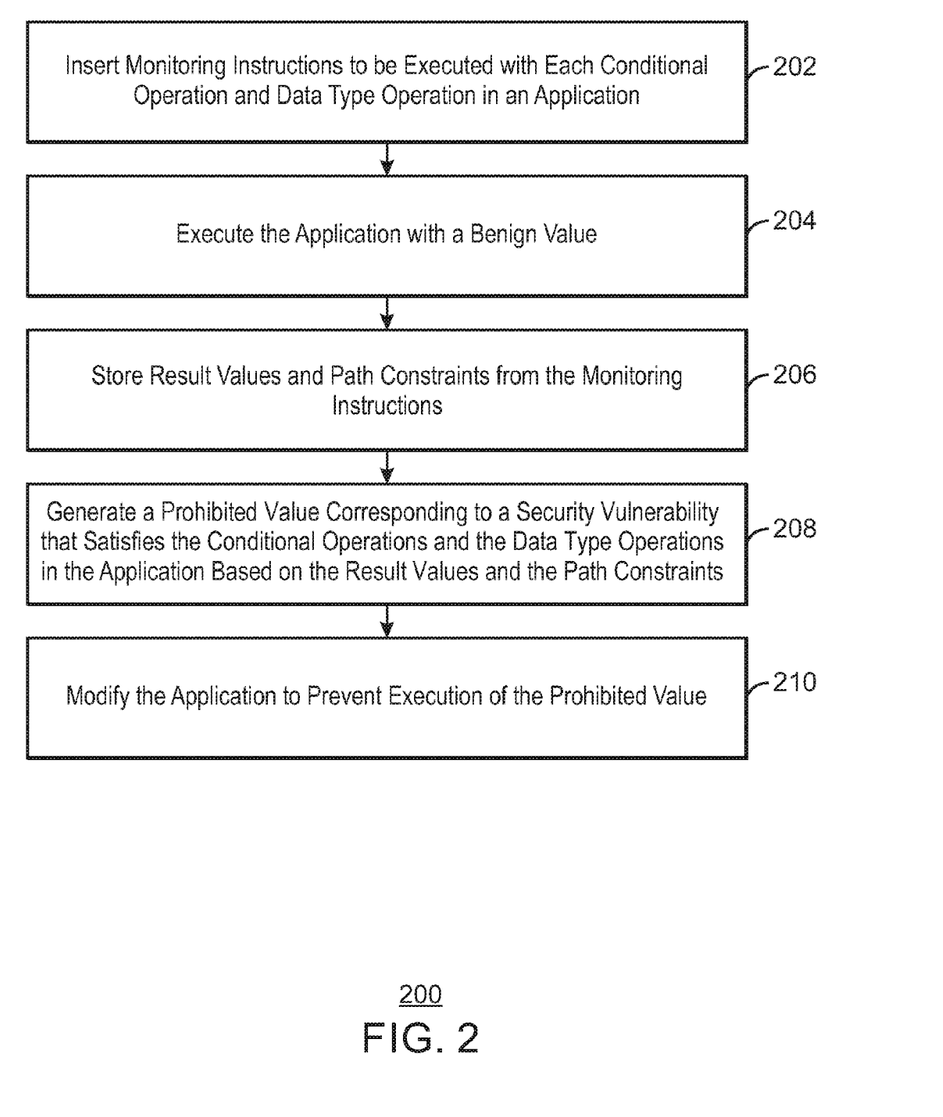
FIG. 2 is a process flow diagram of an example method that can modify an application according to an embodiment described herein.

FIG. 2 is a process flow diagram of an example method that can modify an application. The method 200 can be implemented with any suitable computing device, such as the computing device 100 of FIG. 1.

At block 202, a monitor 124 can insert monitoring instructions to be executed with a set of conditional operations and data type operations in an application. As discussed above, an application can include a mobile application, an enterprise application, or any other suitable computer program. The monitoring instructions can enable the monitor 124 to store data associated with any suitable number of conditional operations and data type operations in the application. In some examples, the conditional operations and data type operations to be monitored can be predetermined and selected as the set of operations for which the monitor 124 is to store data. A conditional operation, as referred to herein, can include any for loop, while loop, if statement, or any other conditional statement. In some examples, the conditional operation can also include logical statements such as and statements and or statements, among others. A data type operation, as referred to herein, can include any instruction related to modifying a data type of a value, and initiating a data type of a value, among others. In some examples, the data type operations can include a string operation, among others. For example, a data type operation can include removing a subset of a string, setting a key value in a map, any suitable set operation, such as adding or removing a member of a set, and the like.

In some embodiments, the monitor 124 can insert the monitoring instructions before each conditional or data type operation, within each conditional or data type operation, or after each conditional or data type operation. The monitoring instructions can indicate which branch of a conditional statement was executed by an application or indicate a resulting value from a data type operation.

At block 204, the monitor 124 can execute the application with a benign value. A benign value, as referred to herein, can include any data value that does not include prohibited code that attempts to view or retrieve sensitive or confidential data by an unauthorized user. A benign value may be free of script characters and other values that can be used to gain access to sensitive or confidential data. Execution of an application with a single benign value can enable the generation of a prohibited value in block 208, which is described below.

At block 206, the monitor 124 can store at least one of result values and path constraints from the monitoring instructions. In some embodiments, the monitor 124 can store result values, path constraints, or any combination thereof. The result values can include values generated by each conditional operation and each data type operation executed with the benign value. The result values, as referred to herein, can indicate how a conditional operation or data type operation was evaluated during execution of an application. For example, the result values can indicate a conditional branch of a conditional operation that was executed. The conditional branches of conditional operations that are executed can be stored as path constraints. In some embodiments, the monitor 124 identifies and stores path constraints and result values in an application between a source point and a sink point in the application. The source point can correspond to a beginning point in a program to be verified and the sink point can correspond to an end point in a program to be verified. The source point can include an instruction requesting user input and the sink point and include an instruction accessing data requiring user authorization. In some embodiments, the monitor 124 can store each of the path constraints executed between the source point and the sink point.

At block 208, the prohibited value generator 126 can generate a prohibited value corresponding to a security vulnerability that satisfies the set of conditional operations and the data type operations in the application based on the result values and the path constraints. In some embodiments, a prohibited value includes an instruction that enables an unauthorized user to retrieve data requiring user authorization. For example, the prohibited value generator 126 can generate a prohibited value corresponding to a security vulnerability that satisfies the conditional operations and the data type operations in the application based on the result values and the path constraints. The security vulnerability can include SQL injection, cross-site scripting, and cross-site request forgery, among others. In some embodiments, the prohibited value generator 126 can identify the security vulnerability that could enable an unauthorized user to access confidential information. The prohibited value generator 126 can generate the prohibited value with a single execution of an application with a benign value. Therefore, the techniques described herein can reduce an amount of time to detect security vulnerabilities in an application and reduce an amount of processor execution time for testing an application.

At block 210, the modifier 210 can modify the application to prevent execution of the prohibited value. In some embodiments, the modifier 128 can detect a set of changes to the application that prevents the security vulnerability and modify the application based on the set of changes. For example, the modifier 128 can modify path constraints within any number of conditional operations or data type operations. In some examples, the modifier 128 can modify conditional operations to prevent a flow of data between a source point and a sink point to prevent a security vulnerability. For example, the modifier 128 can modify conditional statements to change a flow of data within an application to ensure that a prohibited value does is not executed in a sink point. In some embodiments, the modifier 128 can add security instructions to conditional operations and data type operations to modify a prohibited value by removing scripting characters and the like.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the monitor 124 can also generate a taint bit to be associated with the benign value and store the path constraints and result values in response to detecting the taint bit. In some examples, the taint bit can indicate if result values and path constraints are to be stored during the execution of an application. For example, the monitor 124 can discard the result values in response to executing the application with a benign value without a corresponding taint bit. The monitor 124 can also store data corresponding to an execution of additional operations in an application such as logical operations, data manipulation operations, and the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
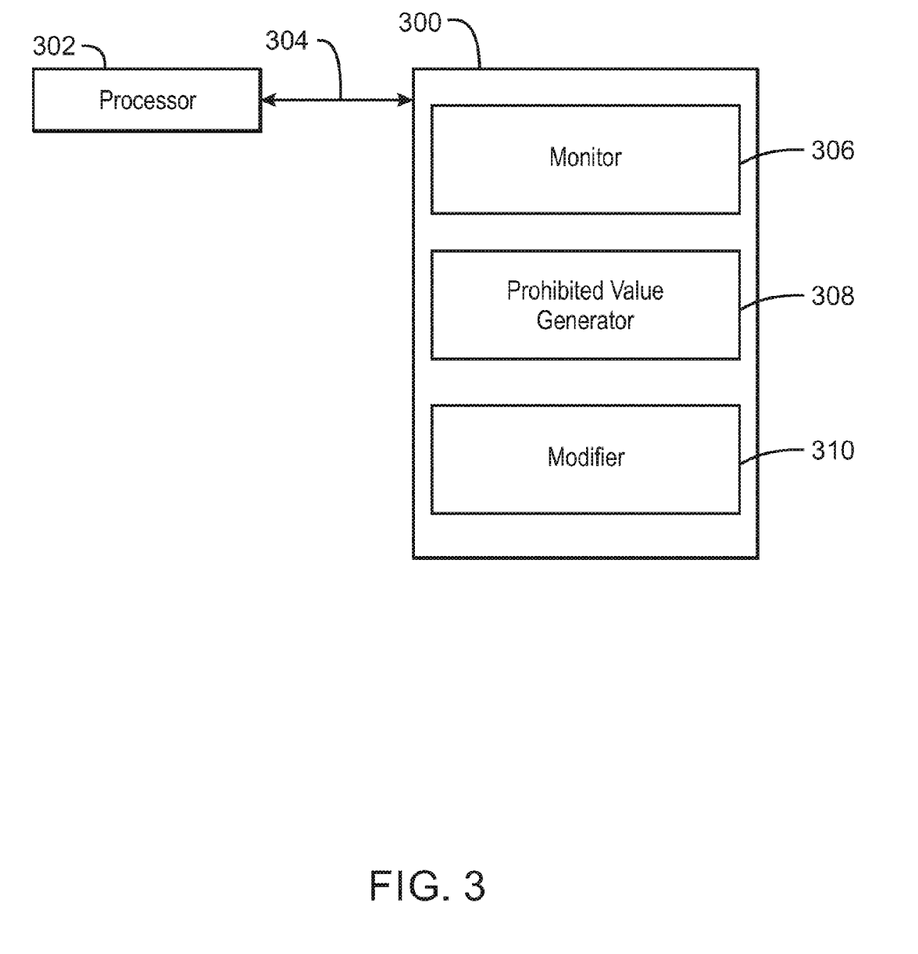
FIG. 3 is a tangible, non-transitory computer-readable medium that can modify an application according to an embodiment described herein.

Referring now to FIG. 3, a block diagram is depicted of an example of a tangible, non-transitory computer-readable medium that can modify an application. The tangible, non-transitory, computer-readable medium 300 may be accessed by a processor 302 over a computer interconnect 304. Furthermore, the tangible, non-transitory, computer-readable medium 300 may include code to direct the processor 302 to perform the operations of the current method.

The various software components discussed herein may be stored on the tangible, non-transitory, computer-readable medium 300, as indicated in FIG. 3. For example, a monitor 306 can insert monitoring instructions to be executed with each conditional operation and data type operation in an application and execute the application with a benign value. The monitor 306 can also store result values and path constraints from the monitoring instructions, the result values comprising values generated by each conditional operation and each data type operation executed with the benign value. A prohibited value generator 308 can generate a prohibited value corresponding to a security vulnerability that satisfies the conditional operations and the data type operations in the application based on the result values and the path constraints. Furthermore, a modifier 310 can modify the application to prevent execution of the prohibited value.

It is to be understood that any number of additional software components not shown in FIG. 3 may be included within the tangible, non-transitory, computer-readable medium 300, depending on the specific application. Furthermore, fewer software components than those shown in FIG. 3 can be included in the tangible, non-transitory, computer-readable medium 300.

Figure 4:
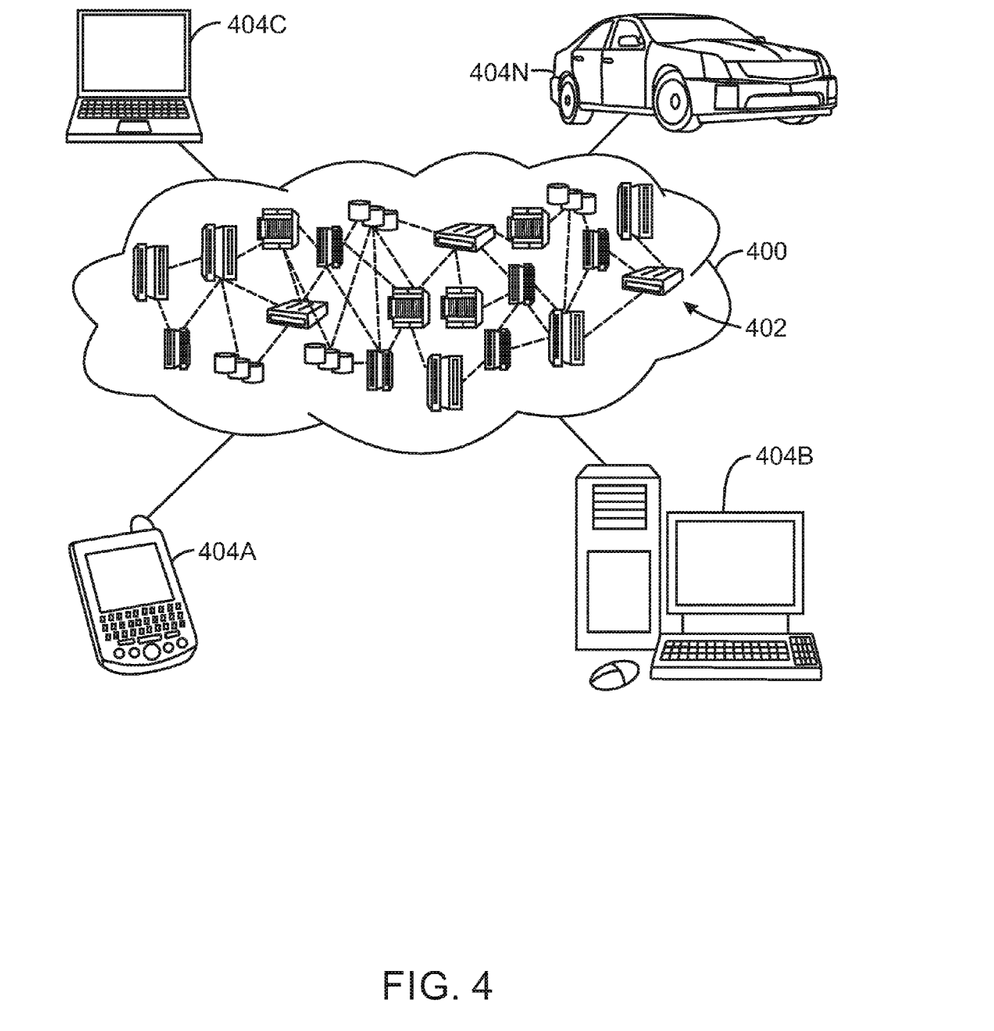
FIG. 4 depicts an illustrative cloud computing environment according to an embodiment described herein.

Referring now to FIG. 4, illustrative cloud computing environment 400 is depicted. As shown, cloud computing environment 400 comprises one or more cloud computing nodes 402 with which local computing devices used by cloud consumers, such as, for example, personal digital assistant (PDA) or cellular telephone 404A, desktop computer 404B, laptop computer 404C, and/or automobile computer system 404N may communicate. Nodes 402 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 404A-N shown in FIG. 4 are intended to be illustrative only and that computing nodes 402 and cloud computing environment 400 can communicate with any type of computerized device over any type of network and/or network addressable connection (e.g., using a web browser).

Figure 5:
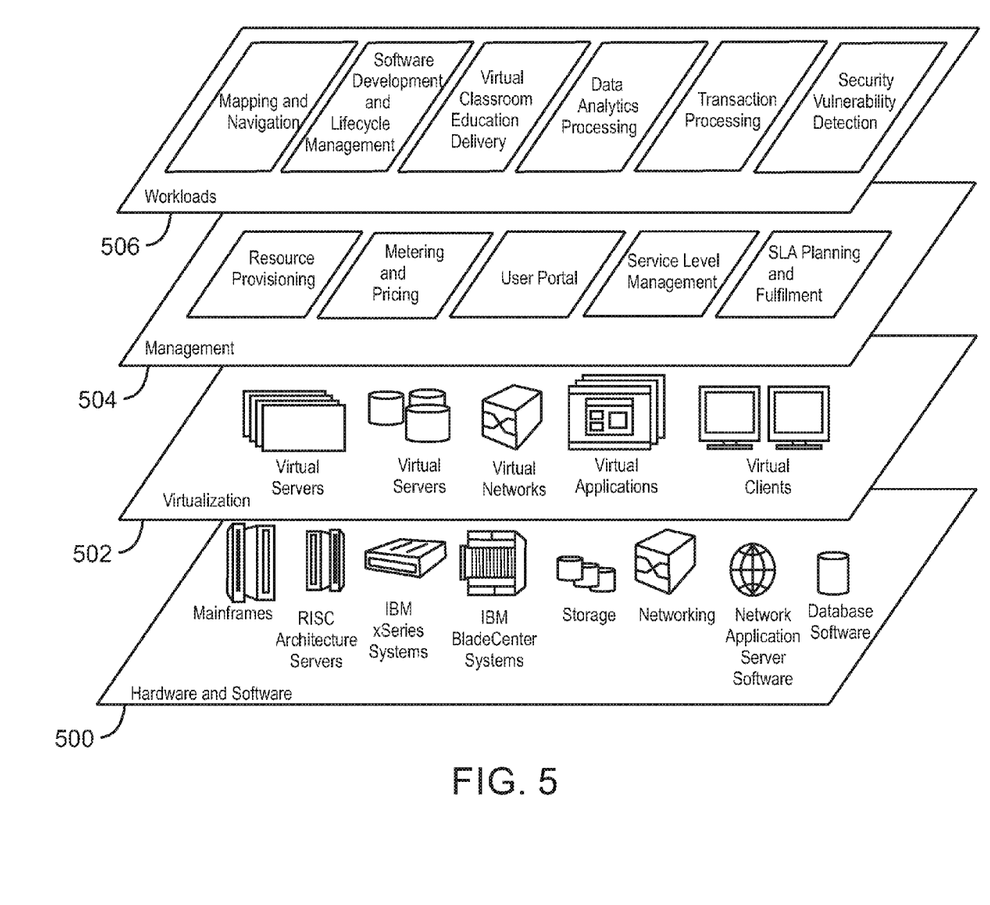
FIG. 5 depicts a set of functional abstraction layers provided by a cloud computing environment according to an embodiment described herein.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided.

Hardware and software layer 500 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 502 provides an abstraction layer from which the following examples of virtual entities may be provided: virtual servers; virtual storage; virtual networks, including virtual private networks; virtual applications and operating systems; and virtual clients. In one example, management layer 504 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 506 provides examples of functionality for which the cloud computing environment may be utilized. Examples of workloads and functions which may be provided from this layer include: mapping and navigation; software development and lifecycle management; virtual classroom education delivery; data analytics processing; transaction processing; and security vulnerability detection.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for modifying an application comprising:
a processor to:
insert monitoring instructions to be executed with a set of conditional operations and data type operations in an application;
execute the application with a benign value;
store at least one of result values and path constraints from the monitoring instructions, the result values comprising values generated by the set of conditional operations and data type operations executed with the benign value;
generate a prohibited value corresponding to a security vulnerability that satisfies the set of conditional operations and data type operations in the application based on the result values and the path constraints; and
modify the application to prevent execution of the prohibited value.

2. The system of claim 1, wherein the result values comprise an execution of the set of conditional operations and data type operations between a source point in the application and a sink point in the operation.

3. The system of claim 2, wherein the source point comprises an instruction requesting user input.

4. The system of claim 2, wherein the sink point comprises an instruction accessing data requiring user authorization.

5. The system of claim 1, wherein the prohibited value comprises an instruction to retrieve data requiring user authorization by an unauthorized user.

6. The system of claim 1, wherein the data type operations comprise a string operation.

7. The system of claim 1, wherein the processor is to:
generate a taint bit to be associated with the benign value; and
store the result values in response to detecting the taint bit.

8. The system of claim 1, wherein the processor is to discard the result values in response to executing the application with a benign value without a corresponding taint bit.

9. A method for modifying an application comprising:
inserting, via a processor, monitoring instructions to be executed with a set of conditional operations and data type operations in an application;
executing, via the processor, the application with a benign value;
storing, via the processor, at least one of result values and path constraints from the monitoring instructions, the result values comprising values generated by the set of conditional operations and data type operations executed with the benign value;
generating, via the processor, a prohibited value corresponding to a security vulnerability that satisfies the set of conditional operations and data type operations in the application based on the result values and the path constraints; and
modifying, via the processor, the application to prevent execution of the prohibited value.

10. The method of claim 9, wherein the result values comprise an execution of the set of conditional operations and data type operations between a source point in the application and a sink point in the operation.

11. The method of claim 10, wherein the source point comprises an instruction requesting user input.

12. The method of claim 10, wherein the sink point comprises an instruction accessing data requiring user authorization.

13. The method of claim 9, wherein the prohibited value comprises an instruction to retrieve data requiring user authorization by an unauthorized user.

14. The method of claim 9, wherein the data type operations comprise a string operation.

15. The method of claim 9 comprising:
generating a taint bit to be associated with the benign value; and
storing the result values in response to detecting the taint bit.

16. A computer program product for modifying an application, the computer program product comprising a computer readable storage medium having program instructions embodied therewith, wherein the computer readable storage medium is not a transitory signal per se, the program instructions executable by a processor to cause the processor to:
insert monitoring instructions to be executed with a set of conditional operations and data type operations in an application;
execute the application with a benign value;
store at least one of result values and path constraints from the monitoring instructions, the result values comprising values generated by the set of conditional operations and data type operations executed with the benign value;
generate a prohibited value corresponding to a security vulnerability that satisfies the set of conditional operations and data type operations in the application based on the result values and the path constraints; and
modify the application to prevent execution of the prohibited value.

17. The computer program product of claim 16, wherein the result values comprise an execution of the set of conditional operations and data type operations between a source point in the application and a sink point in the operation.

18. The computer program product of claim 17, wherein the source point comprises an instruction requesting user input.

19. The computer program product of claim 17, wherein the sink point comprises an instruction accessing data requiring user authorization.

20. The computer program product of claim 16, wherein the prohibited value comprises an instruction to retrieve data requiring user authorization by an unauthorized user.

* * * * *